UNITED STATES PATENT OFFICE.

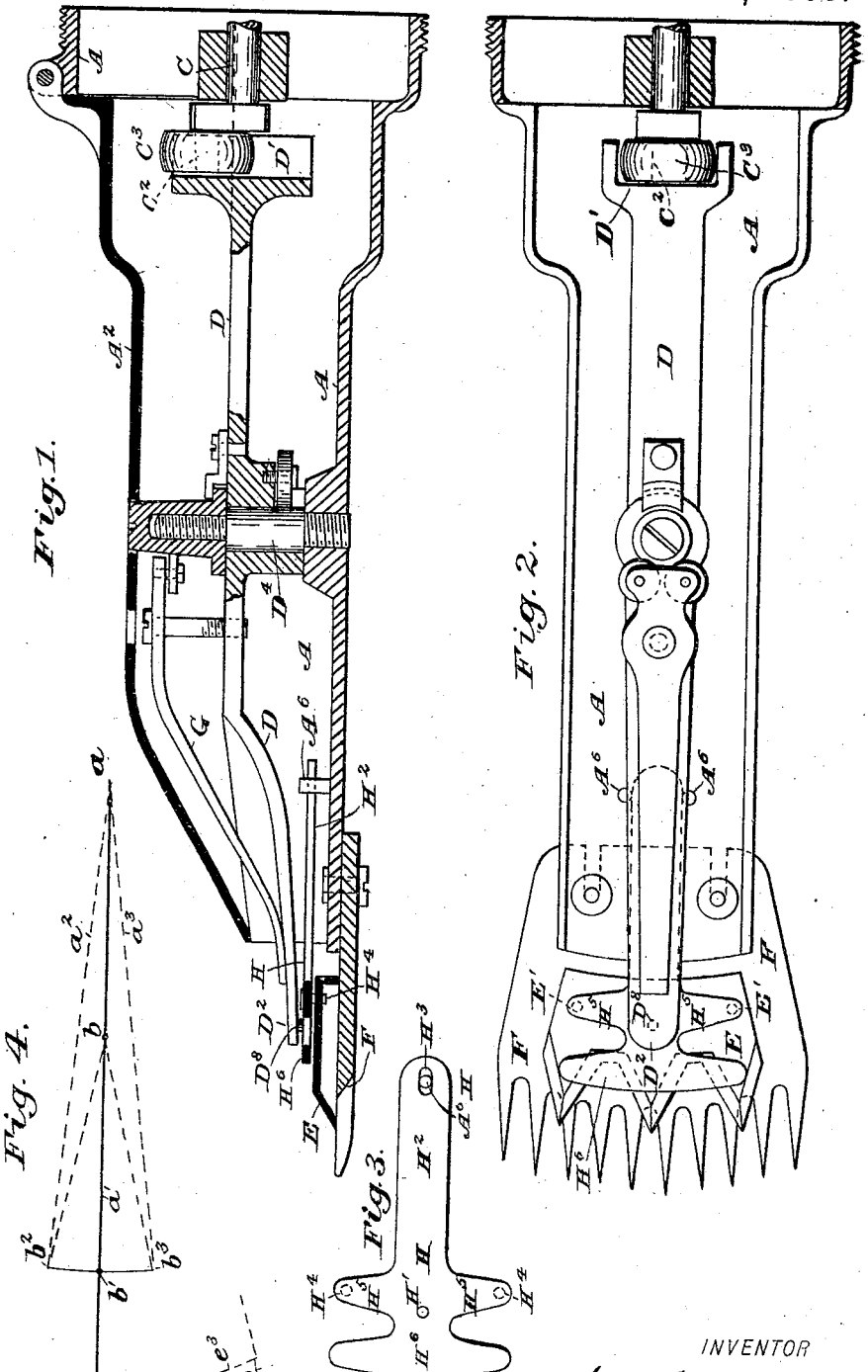

ALFRED MELCHIOR, OF SYDNEY, NEW SOUTH WALES.

ANIMAL-SHEARS.

SPECIFICATION forming part of Letters Patent No. 492,818, dated March 7, 1893.

Application filed February 13, 1892. Serial No. 421,476. (No model.)

*To all whom it may concern:*

Be it known that I, ALFRED MELCHIOR, mechanical engineer, a subject of the Queen of Great Britain, residing at Sydney in the British Colony of New South Wales, have invented new and useful Improvements in Sheep-Shearing Machines, of which the following is a specification.

This invention relates to sheep shearing machines which have a cutter reciprocating above and in contact with a comb and which cutter is actuated by a vibrating lever whose motion is given in any convenient manner. This invention has for its principal object the imparting of a peculiar travel or reciprocation to the cutter so that each tooth or finger has a "draw" or "drag" over such of the teeth or fingers of the comb it is in contact with as well as its sidewise motion; that is to say as each tooth or finger of the cutter passes sidewise over the comb it retires and advances a comparatively small distance relatively to the length of the teeth or fingers of said comb and thus as well as cutting has a gathering influence or a draw or drag upon the material between said teeth or fingers. It has as a secondary object the equalizing of the tension or pressure on the cutter to press it upon the comb.

In order that this invention may be clearly understood reference will now be made to the drawings herewith in which Figure 1 is a sectional elevation of a sheep shearing machine in which my present improvements are incorporated. Fig. 2 is a plan of the same with top cover removed. Fig. 3 is a plan of the second or auxiliary lever and Fig. 4 is a diagram of the motion of the cutter.

For convenience the following parts are shown, viz., the frame or casing A (and a cover $A^2$) to which motion devices of any convenient form may be attached to revolve spindle C having pin $C^2$ with roller $C^3$ working in jaw D' of vibrating or main lever D which lever is fulcrumed upon stud or pin $D^4$ and has tension spring G and means for regulating same all of which are particularly described in the specification and drawings. But it is to be understood that these parts or their arrangement are not essential to the carrying out of this present invention as it is only necessary that there be a vibrating or main lever pivoted in the center as shown in the drawings or pivoted at its back end as used in other sheep shearing machines and that there be tension devices or means of imparting pressure to the lever or to the cutter. In the outer end or nose $D^2$ of the vibrating or main lever D is secured a pin $D^8$ taking into hole or orifice H' in second or auxiliary lever H the tail $H^2$ of which is controlled by pins $A^6$ fixed in frame A between which pins said tail takes (or if preferred as shown in Fig. 3 the tail $H^2$ may have a slot $H^3$ to take over one fixed pin $A^6$) so that while said lever H may have free lengthwise movement its tail is prevented from moving sidewise. The pins or pintles $H^4$ in the outer ends $H^5$ of the head of lever H take into holes or orifices E' in the cutter E and so convey the motion of lever D to said cutter with the variation caused by the tail $H^2$ being controlled. The extension or transverse spread $H^6$ of the head of said lever H preferably "tempered" or made elastic reaches outwardly to each side of the cutter E and distributes evenly over the whole of said cutter the pressure put upon lever D by the tension spring G or other tension devices. As the lever D is reciprocated it moves the pin $D^8$ and head of lever H and the cutter E across the comb F said pin $D^8$ moving on the circumference of a circle with the fulcrum or pivot $D^4$ of main lever D as a center while the second or auxiliary lever H by reason of its tail control causes the cutter E to swing on the pin $D^8$ as a center and describe an arc which will cause the teeth of the cutter E to cut the main arc described by the main lever from the center $D^4$ and imparting to the said teeth a "draw" or "drag" or gathering influence. Referring to the diagram Fig. 4 $a$ is the pivot or fulcrum of the main lever—full line $a'$ its central position and dotted lines $a^2$ and $a^3$ its extreme limit in motion—$b$ is the center of the control of the tail of the second or auxiliary lever $b'$ its connection with the main lever and $b^2$ and $b^3$ the limits of motion of said connection. It is to be noted that the center $b$ has a variable position on the center line as it must advance and retire with the movement of the main lever $e$ in full lines is the central position of the center tooth or finger of the cutter and the full curve (not quite circular) its line of motion $e'$ in dotted lines are the extreme positions of the outer teeth or fingers of the cutter $e^2$ and $e^3$ dotted curves are the lines of motion of said outer teeth or fingers and the other curve $e^4$ is the line of ordinary motion where there is no "draw" or "drag" of the teeth or finger.

From the foregoing description it will be clear that the lever H forms practically a rigid tail piece or arm secured to the cutter E, to act as though it were an integral part thereof, and these parts thus combined turn on the pivot $D^8$ which connects them with the arm D, so that as the arm swings from side to side from its center $D^4$, the cutter with its rigid tail lever H will be given a twisting or a turning movement about the pivot $D^8$ by reason of the rear end of the said tail lever being controlled by the pins $A^6$.

Having thus described and ascertained the nature of this said invention and in what manner the same is to be performed, what it is desired to claim is—

1. In a shearing device, the combination of the main comb oscillating main lever, the cutter pivotally connected therewith, and carried thereby to turn in relation to the main comb and the controlling connection for oscillating the cutter on its pivotal connection in addition to the oscillation of the main lever, as the main lever oscillates, substantially as described.

2. In a shearing device, the combination of the vibrating main lever, the cutter, the supplemental lever H attached thereto and forming a tail piece of said cutter, the loose pivotal connection for the said supplemental lever at its rear end, and the pivotal connection between the lever H and the main lever, substantially as described.

3. In combination in a shearing device, the cutter, the lever H rigidly secured thereto and having a cross head $H^5$ extending forward over the teeth of the cutter to press thereon and the pintles $H^4$ connecting it with the cutter, the loose pivotal connections at the rear of the lever comprising the pins $A^6$ and the pivot $D^8$ between the forward part of said lever and the main lever, substantially as described.

Dated this 5th day of December, 1891.

ALFRED MELCHIOR.

Witnesses:
 FRED WALSH,
  *Fel. Aust. Inst. P. A.*
 THOMAS JAMES WARD.